United States Patent [19]
Naiki

[11] Patent Number: 5,173,798
[45] Date of Patent: Dec. 22, 1992

[54] BEAM SCANNING APPARATUS WITH SENSOR FOR DETECTING BEAM POSITION

[75] Inventor: Toshio Naiki, Toyohashi, Japan

[73] Assignee: Minolta Camera Kabushiki Kaisha, Osaka, Japan

[21] Appl. No.: 795,914

[22] Filed: Nov. 20, 1991

[30] Foreign Application Priority Data

Nov. 22, 1990 [JP] Japan ................... 2-319721

[51] Int. Cl.⁵ .......................................... G02B 26/08
[52] U.S. Cl. ................................. 359/216; 359/218; 250/235; 346/108
[58] Field of Search ............... 359/216, 217, 218, 219, 359/662, 708, 711, 719; 346/108, 160; 250/235, 236

[56] References Cited

U.S. PATENT DOCUMENTS

| | | | |
|---|---|---|---|
| 4,657,352 | 4/1987 | Suda et al. | 359/719 |
| 4,720,632 | 1/1988 | Kaneko | 359/218 |
| 4,729,645 | 3/1988 | Suda | 359/719 |
| 4,731,623 | 3/1988 | Oda et al. | 346/160 |
| 4,765,725 | 8/1988 | Suda | 359/719 |
| 4,978,975 | 12/1990 | Saito | 346/108 |
| 4,978,977 | 12/1990 | Ohmori et al. | 346/108 |

FOREIGN PATENT DOCUMENTS 54-140548 10/1979 Japan.
54-140558 10/1979 Japan.

*Primary Examiner*—Loha Ben
*Attorney, Agent, or Firm*—Price, Gess & Ubell

[57] ABSTRACT

A beam scanning apparatus comprises: a beam source for generating optical beam; a polygon mirror for deflecting the optical beam to scan a beam receiving surface; a beam receiving device, arranged at a position inequivalent to the beam receiving surface, for detecting the optical beam which is deflected by the polygon mirror; and an aspherical lens, arranged in front of the beam receiving device, for converging optical beam on the beam receiving device.

14 Claims, 13 Drawing Sheets

Fig. 8
Lateral Aberration on the Gaussian Plane
MERIDIONAL RAY
SI=1800.  BETA=-0.162  S'=-1.439  FNO=-7.27
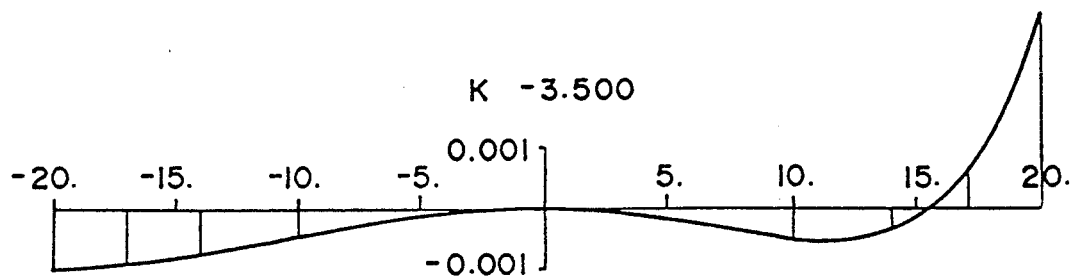
K  -3.500
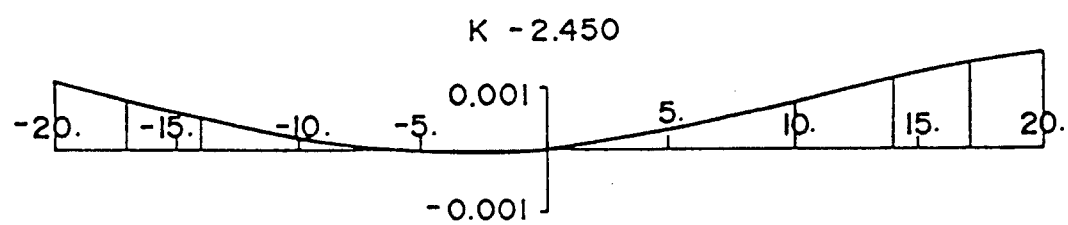
K  -2.450
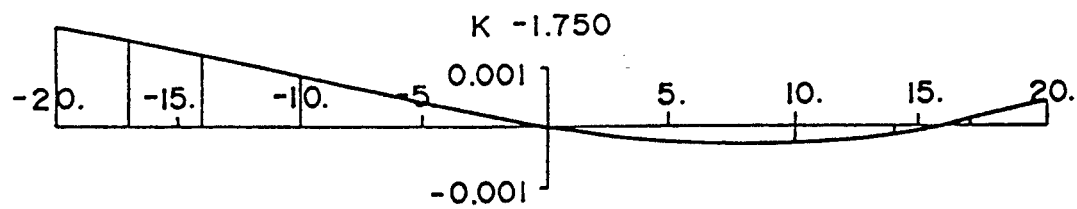
K  -1.750
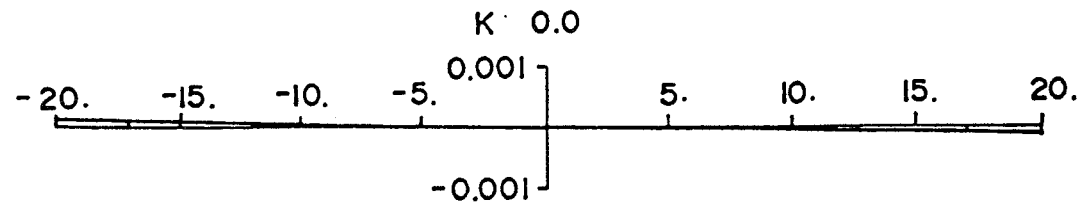
K  0.0

Lateral Aberration on the Gaussian Plane

SAGITTAL RAY

SI=1800. BETA=-0.162 S'=-1.439 FNO=-7.27

Fig. 12
Lateral Aberration on the Gaussian Plane
MERIDIONAL RAY
SI=1800.  BETA=-0.162  S'=-9.440  FNO=-7.27
K -3.500
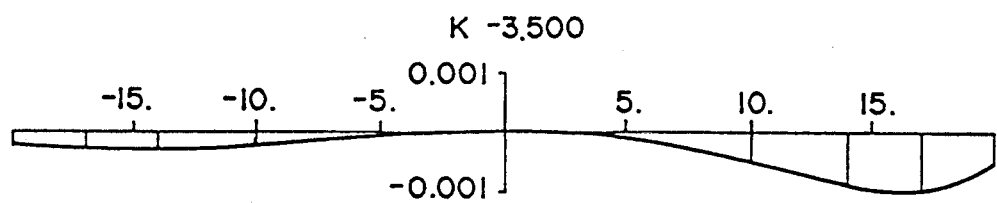
K -2.450
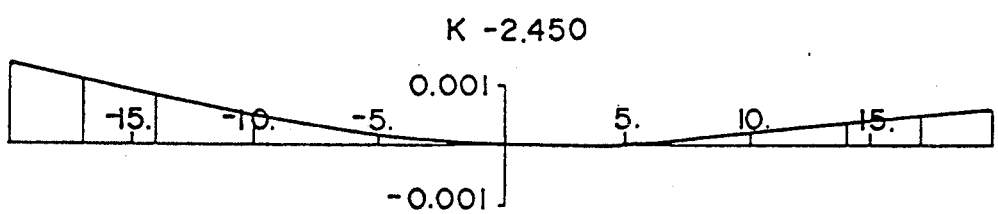
K -1.750
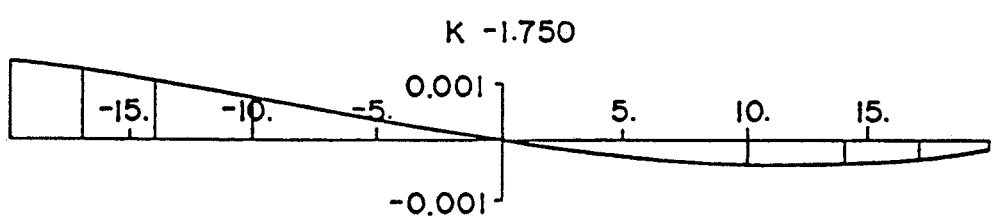
K 0.0
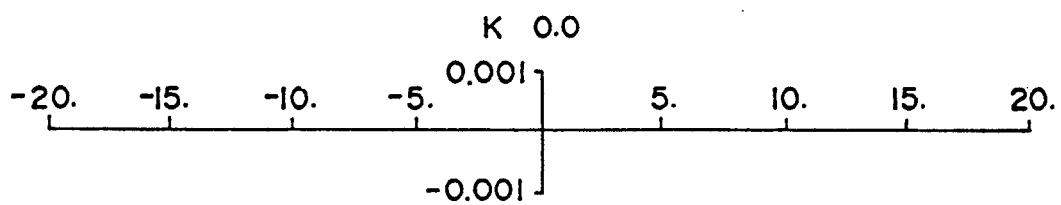

Fig. 13
Lateral Aberration on the Gaussian Plane
SAGITTAL RAY
SI=1800.  BETA=-0.162  S=-9.440  FNO=-7.27
K -3.500
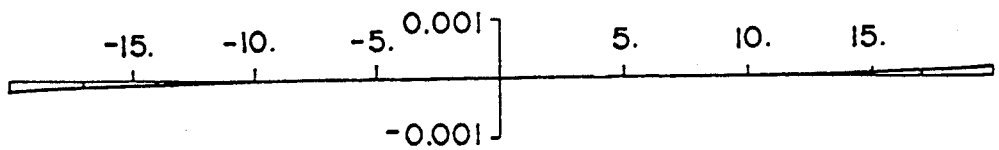
K -2.450
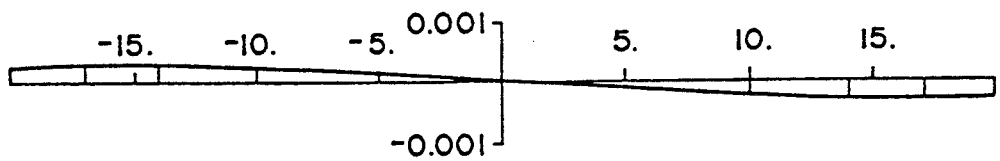
K -1.750
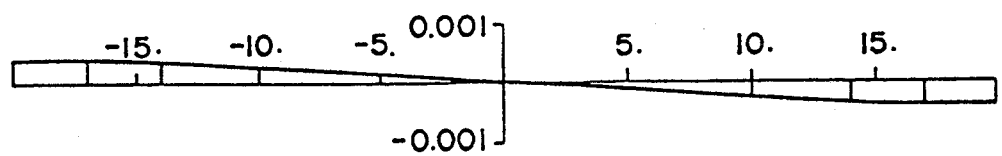

BEAM SCANNING APPARATUS WITH SENSOR FOR DETECTING BEAM POSITION

BACKGROUND OF THE INVENTION

1. Field of the Invention

The present invention relates to a beam scanning apparatus. More particularly, the present invention relates to a synchronism detecting mechanism for detecting a scanning position of a beam.

2. Description of the Prior Art

In a beam scanning apparatus incorporated in a laser beam printer, a facsimile, etc., a larger beam radiated by a semiconductor laser device is deflected by a rotary polygonal mirror (polygon mirror) at an isometric speed. The laser beam reflected is directed to a scanning line (a photoreceptor) to form an image after the scanning speed thereof is corrected by an fθ lens system. On each scanning operation, the laser beam is irradiated on a beam receiving device (hereinafter referred to as "SOS sensor") arranged at a position equivalent to the scanning line in order to detect a beam position. The reason why the SOS sensor is provided at a position equivalent to the scanning line is that a high synchronism detection accuracy is obtained at the equivalent position since scanning is performed under a condition where aberrations are removed and beam is converged.

In recent years, since a demand for a compact beam scanning apparatus has been increasing so that a degree of freedom for arranging the SOS sensor has been decreasing, or since one beam scanning apparatus is used for a plurality of printers, the SOS sensor is inevitably arranged at a position inequivalent to the scanning line. As a result, measures are required for securing a necessary synchronism detection accuracy for the SOS sensor provided at an inequivalent position.

The following are the factors which determine synchronism detection accuracy:

(1) beam diameter on the SOS sensor;
(2) response speed and sensitivity of the SOS sensor and beam quantity; and
(3) scanning speed of beam on the SOS sensor.

An output waveform of a sensor when beam passes on the SOS sensor is a substantially square wave, and the inclination of a rising portion of the output waveform affects the detection accuracy (the inclination is preferably steep).

As a prior art where the SOS sensor is arranged at a position inequivalent to the scanning line, Japanese laid-open Patent Application No. S54-140548 is known. In the synchronism detection apparatus according to the prior art, in order to improve detection accuracy, the SOS sensor is arranged beyond a position equivalent to the scanning line, and beam is re-converged by a lens in front of the sensor to increase scanning speed. However, when the lens arranged in front of the SOS sensor is a spherical lens, it is difficult to correct aberrations. Because of this, there arises a problem that beam is not excellently converged on the SOS sensor when the beam misses the center of the lens due to errors in installing the lens or other elements, or a due to thermal deformation of the housing.

SUMMARY OF THE INVENTION

An object of the present invention is to provide a beam scanning apparatus where high synchronism detection accuracy is obtained even when a beam receiving device for detecting a beam position is arranged at a position inequivalent to the scanning line and the detection can be realized even when beam slightly deviates from the optical axis.

According to one feature of the present invention, a beam scanning apparatus is provided with: a beam source for generating optical beam; deflecting means for deflecting the optical beam to scan a beam receiving surfaces; a beam receiving device, arranged at a position inequivalent to the beam receiving surface, for detecting the optical beam which is deflected by the deflecting means; and an aspherical lens, arranged in front of the beam receiving device, for converging optical beam on the beam receiving device.

BRIEF DESCRIPTION OF THE DRAWINGS

This and other objects and features of this invention will become clear from the following description taken in conjunction with the preferred embodiments with reference to the accompanied drawings in which:

FIGS. 7, 8 and 9 are graphic representations of aberrations of the aspherical lens shown in FIG. 6;

FIGS. 11, 12 and 13 are graphic representations of aberrations of the aspherical lens shown in FIG. 10.

DETAILED DESCRIPTION OF THE PREFERRED EMBODIMENT

A beam scanning apparatus which is an embodiment of the present invention will hereinafter be described with reference to the drawings.

Figure 1:
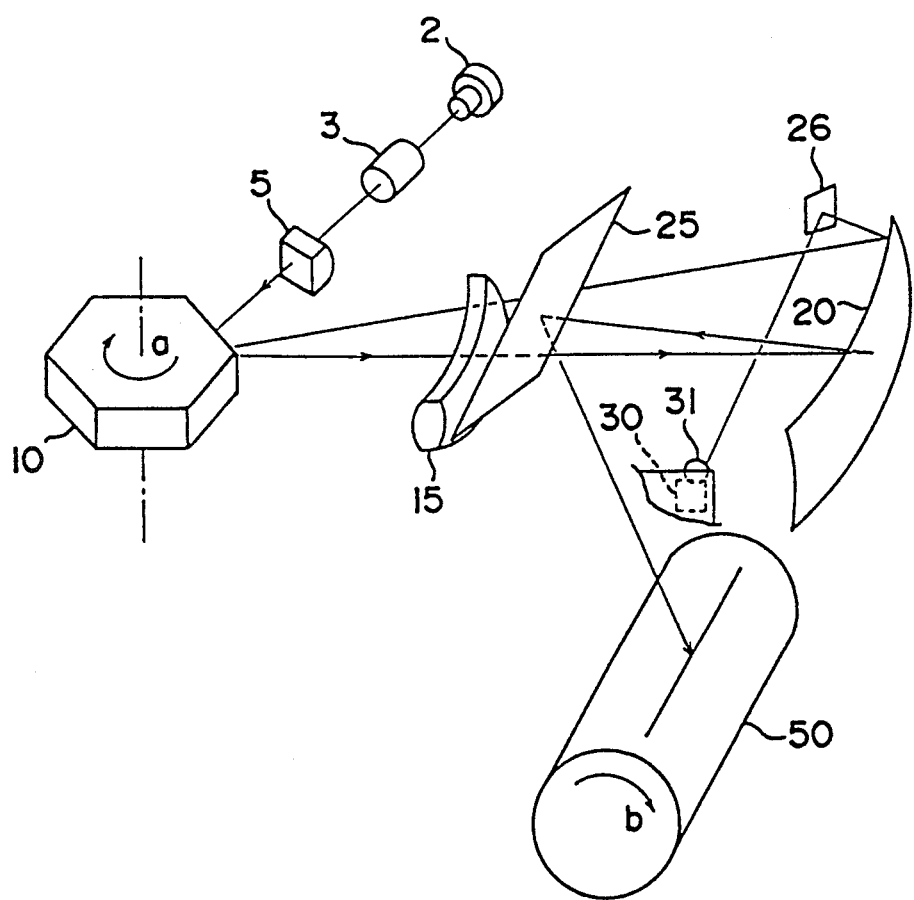
FIG. 1 is a perspective view showing an arrangement of an optical device of a beam scanning apparatus which is an embodiment of the present invention.
Figure 2:
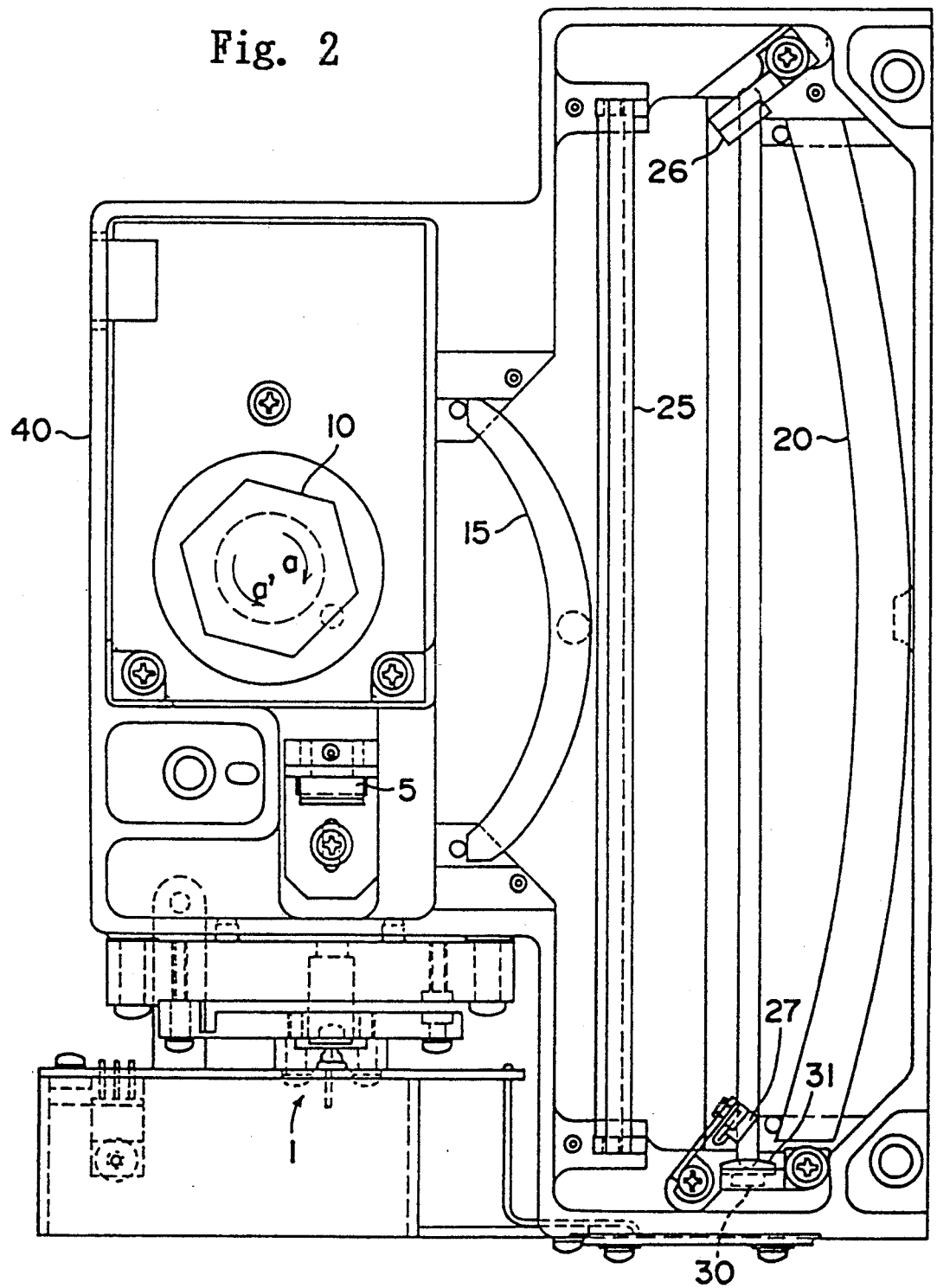
FIG. 2 is a plan view of the beam scanning apparatus.
Figure 3:
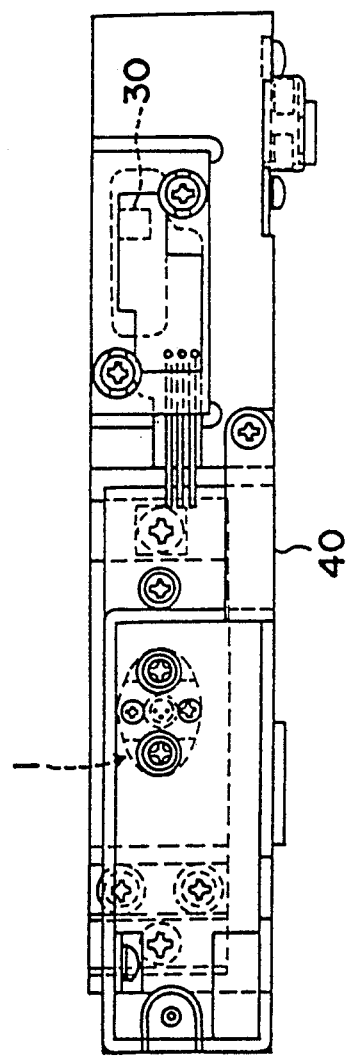
FIG. 3 is a front view of the apparatus shown in FIG. 2.

In FIGS. 1, 2 and 3, a beam scanning apparatus includes a semiconductor laser device 2, a collimator lens 3, a cylindrical lens 5, a polygon mirror 10, a toroidal lens 15, a spherical mirror 20, a reflecting mirror 25 for scanning, a reflecting mirror 26 for SOS, an SOS sensor 30 and an aspherical lens 31 for aberration correction. The above members are housed and fixed in a housing 40 made of plastic. The semiconductor laser device 2 and the collimator lens 3, which are united as a beam source unit 1, are attached to the housing 40.

The semiconductor laser device 2 is controlled to be modulated (turned ON/OFF) based on image information. The laser beam radiated by the semiconductor laser device 2 is converted by the collimator lens 3 into a beam converged at a finite position in the rear. Thereafter, the spot configuration thereof is changed by the cylindrical lens 5 into a linear form where the beam spot extends along the scanning direction, and the beam reaches the polygon mirror 10. The polygon mirror 10 rotates at a constant speed in a direction shown by the arrow a. The laser beam is deflected at an isometric speed in a direction perpendicular to a rotation axis of the polygon mirror 10 and is directed to the toroidal lens 15. In a scanning plane, an incident and exit surfaces of the toroidal lens 15 are concentric circles. The toroidal lens 15 has a constant power in a direction perpendicular to the scanning plane, and in corporation with the cylindrical lens 5, it compensates for an inclination of a plane of the polygon mirror 10. The beam having passed through the toroidal lens 15 is reflected by the spherical mirror 20, and forms an image on the photoreceptor drum 50 through the reflecting mirror 25. The spherical mirror 20 has a function to correct field curvature as well as an $f\theta$ function (distortion correction) to correct scanning speed of laser beam.

The SOS sensor 30 is used for correcting an error, caused by an error in dividing the plane of the polygon mirror 10, of a beam position of every scanning, and is arranged beyond a position equivalent to the scanning line on the photoreceptor drum 50. On each scanning operation, laser beam deflected by the polygon mirror 10 is directed to the aspherical lens 31 through the toroidal lens 15, the spherical mirror 20 and the reflecting mirror 26, and is incident on the SOS sensor 30. In this arrangement, the SOS sensor 30 is arranged through the aspherical lens 31 beyond a position equivalent to the scanning line.

The apparatus described in this embodiment is designed so that it can also be used for an appartus where laser beam is scanned by rotating the polygon mirror 10 in a direction shown by the arrow a' (see FIG. 2). In this case, the SOS sensor 30 receives laser beam reflected by another reflecting mirror 27 for SOS and detects a beam position. In this case, the SOS sensor 30 is arranged, through the aspherical lens 31, at a position closer than a position equivalent to the scanning line.

Figure 4:
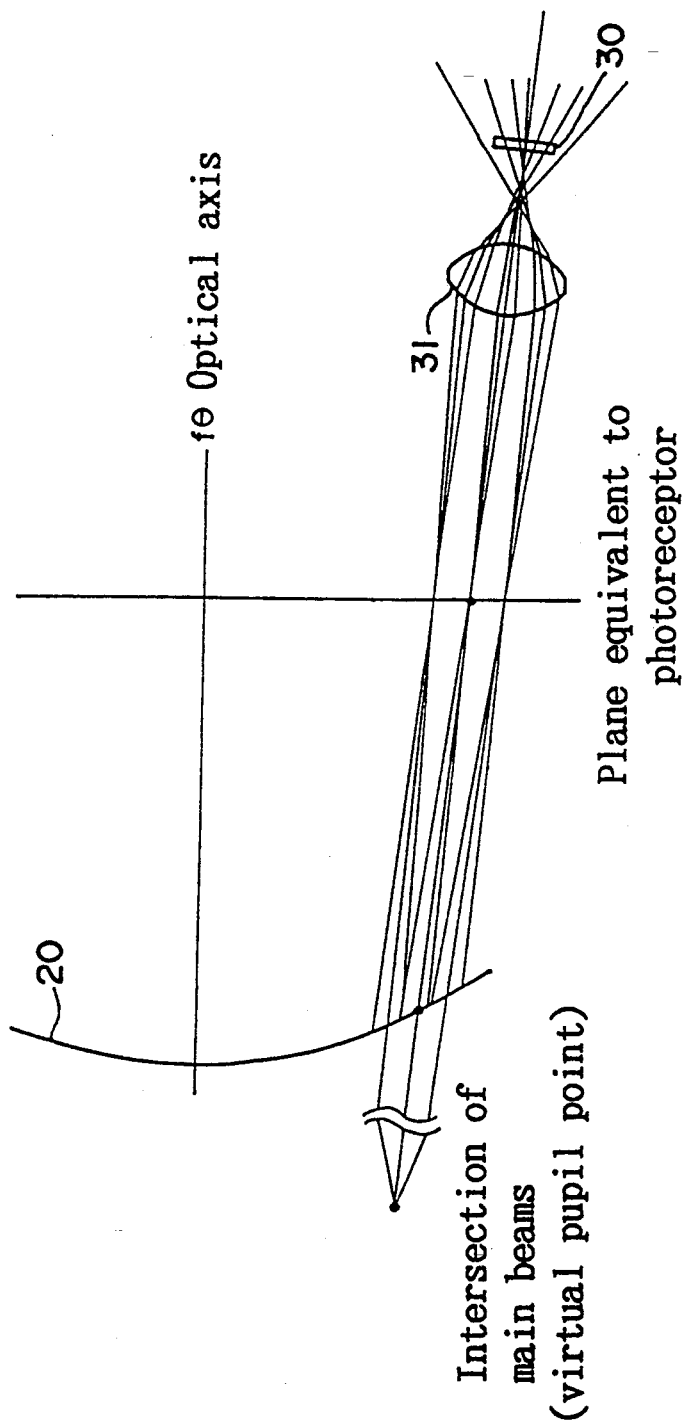
FIG. 4 shows a main portion of an SOS optical system.

As shown in FIG. 4, the aspherical lens 31, which is a convex lens symmetrical about the optical axis, converges incident laser beam on an image plane. It converges even laser beam which deviates from the optical axis of the aspherical lens 31. Thus, the laser beam incident on a different position on the lens surface is converged at a different position on the same image plane. That is, even if the SOS sensor is arranged at a position inequivalent to the scanning line, beam diameter on the sensor 30 is decreased and the beam scans on the SOS sensor 30 with a fixed width. Consequently, synchronism detection accuracy increases.

In this embodiment, either of the following two examples are employed as the aspherical lens 31:
  a first example having an aspherical incident surface and a spherical exit surface; and
  a second example having an aspherical incident surface and an aspherical exit surface.
In both of the above examples, the aspherical lens is constructed so that the refractive power of the end portion is weaker than that of the central portion compared with a spherical lens.

Now, numerical data and an aberration performance of each of the first and second examples will be described. The first and second examples are examples where laser beam is incident on the SOS sensor 30 through the reflecting mirror 26. Thus, the SOS sensor 30 is arranged beyond a position equivalent to the scanning line.

FIRST EXAMPLE

Only Incident Surface Is Aspherical

Figure 5:
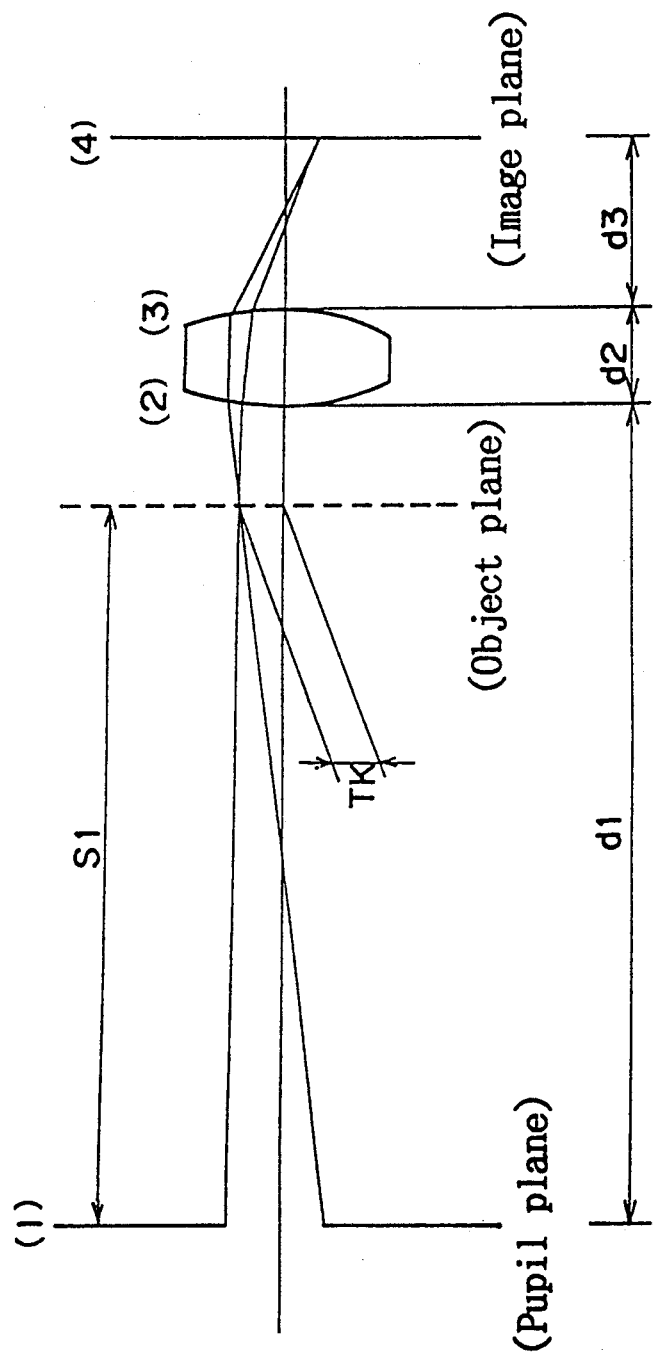
FIG. 5 shows an arrangement of an aspherical lens.
Figure 6:
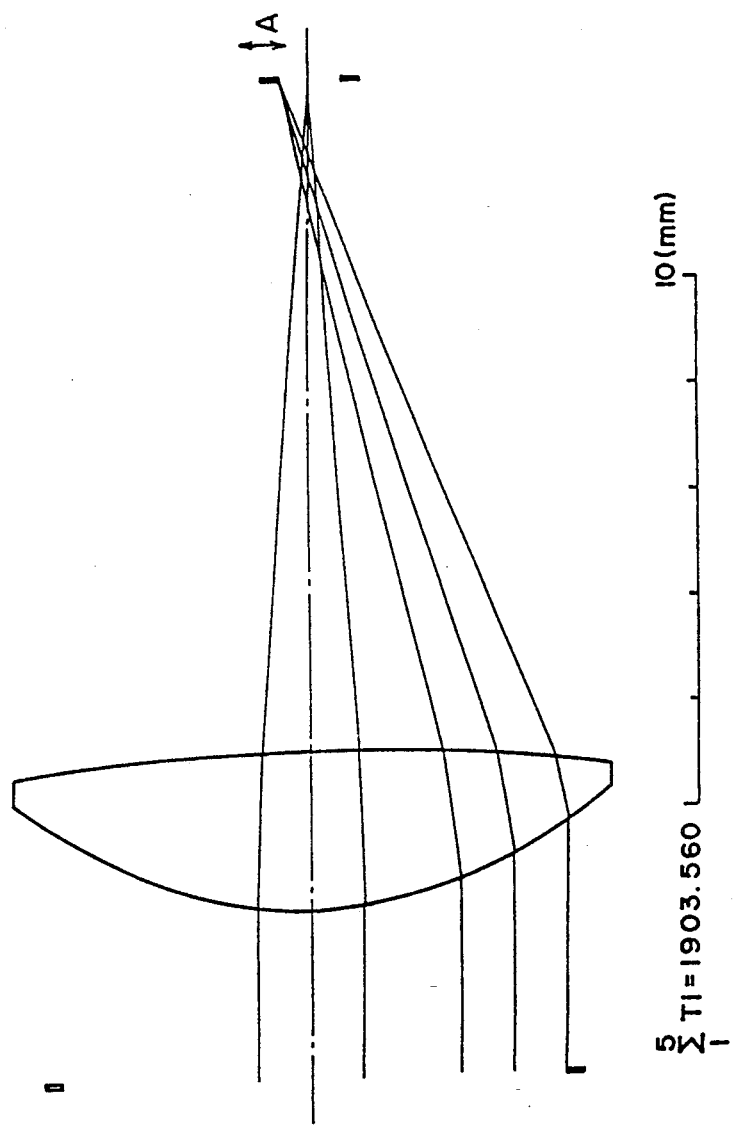
FIG. 6 shows an optical path of an aspherical lens which is a first example.

FIG. 5 shows an arrangement of an aspherical lens. FIG. 6 shows an optical path of an aspherical lens which is the first example. Tables 1 and 2 show numerical data thereof.

In Table 1, a number (1) represents a virtual pupil plane, a number (2) represents a first surface of the lens (a surface on the incidence side), a number (3) represents a second surface of the lens (a surface on the exit side), and a number (4) represents an image plane. f represents a focal length of the lens, S1 represents a distance from the virtual pupil plane to a plane equivalent to a photoreceptor (a virtual object point), and TK represents an object height. The virtual pupil plane is a plane perpendicular to the optical axis of the lens and including a position where a principal ray of scanning beam at each timing intersects. Each beam is directed therefrom toward the plane equivalent to the photoreceptor to be converged thereon.

Table 2 shows aspherical surface data. When the optical axis is the X-axis and the rectangular coordinate Y-axis and Z-axis are on a plane where X=0, the aspherical surface is represented by X=f(Y, Z), and when $Y^2+Z^2=\phi^2$, the value of the aspherical surface is represented by Ai which is obtained by $$X = \frac{C_o\phi^2}{1 + (1 - C_o^2\phi^2)^{\frac{1}{2}}} + \sum_{i=1}^{16} Ai\phi^i,$$

where $C_o$ represents an inverse number of a radius of curvature.

Figure 7:
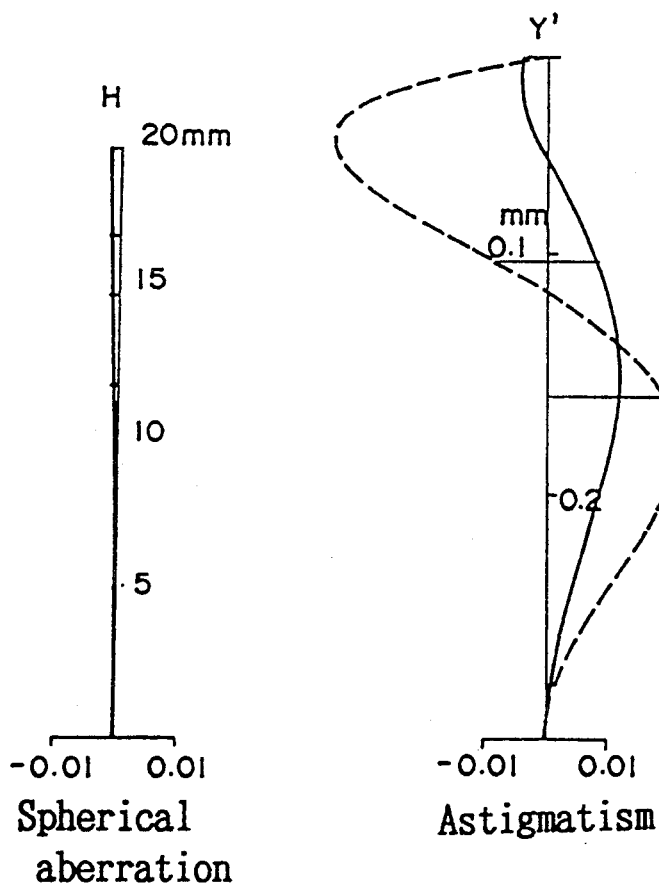

FIG. 7 shows aberration curves of the first example. In the figure, the solid lines represent aberrations on a plane perpendicular to a scanning plane, and the dotted line represents aberration on the scanning plane.

Figure 9:
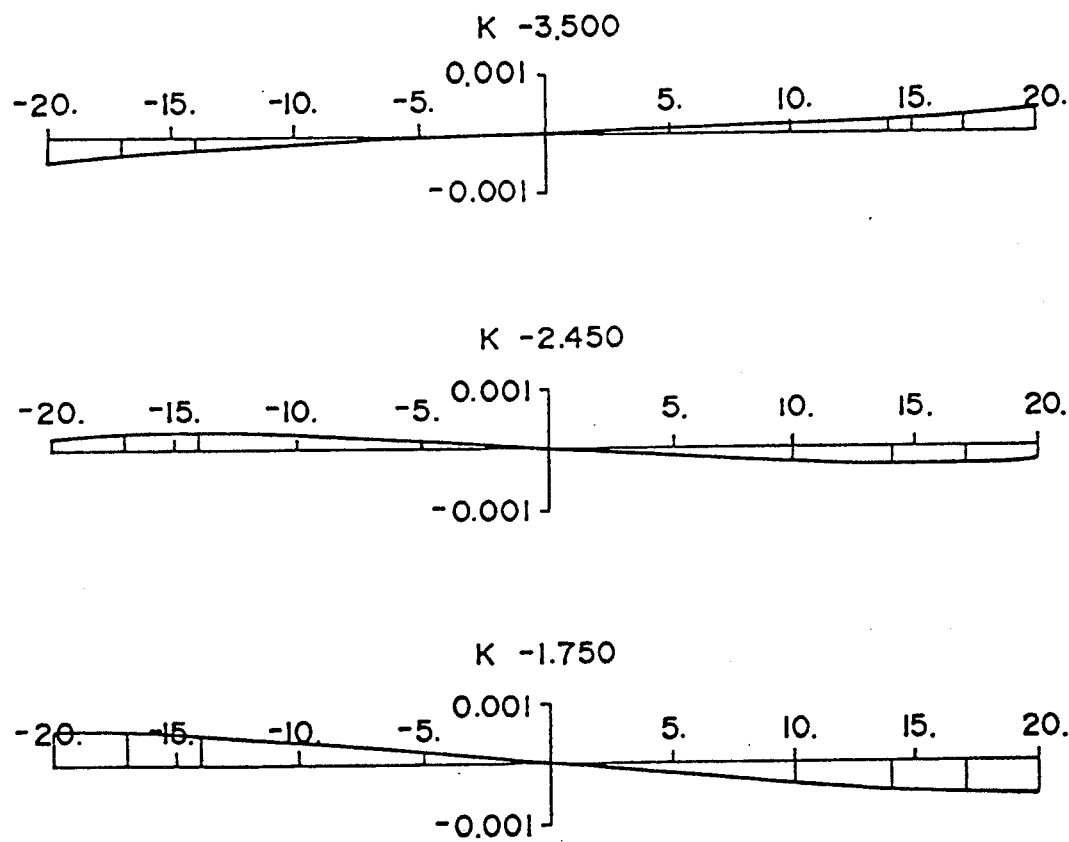

FIGS. 8 and 9 show lateral aberrations on the Gaussian plane for an object height TK. FIG. 8 shows aberrations on the scanning plane. FIG. 9 shows aberrations on the plane perpendicular to the scanning plane.

SECOND EXAMPLE

Both Planes Are Aspherical

Figure 10:
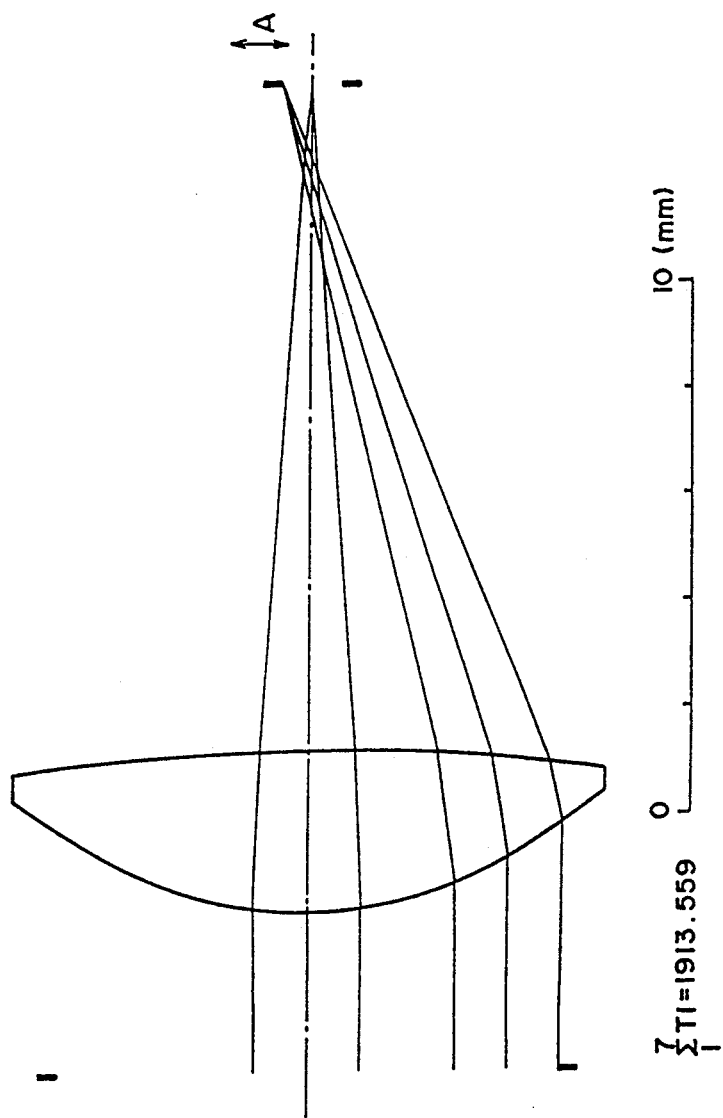
FIG. 10 shows an optical path of an aspherical surface which is a second example.

FIG. 10 shows an optical path of an aspherical lens which is the second example. Tables 3, 4 and 5 show numerical data thereof.

Figure 11:
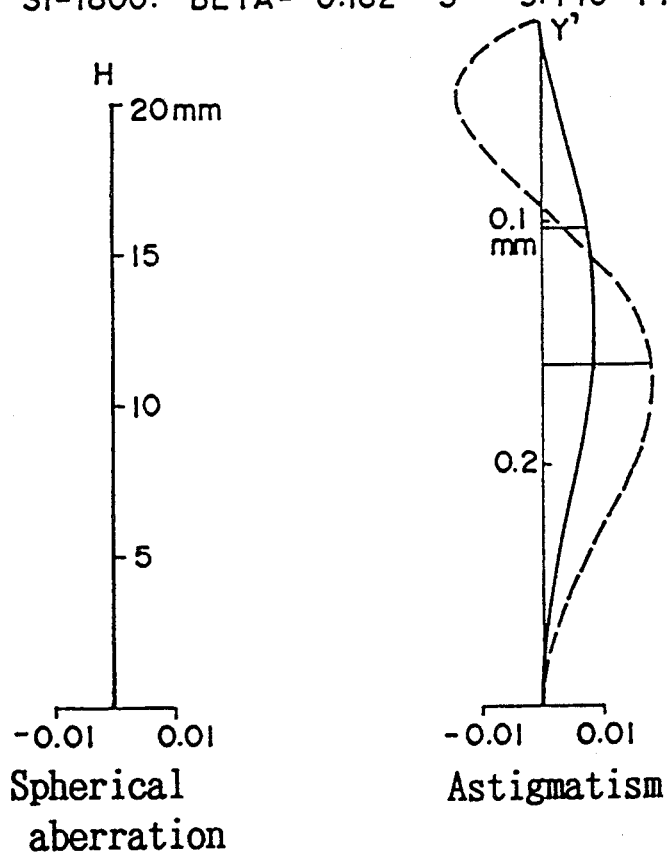

FIG. 11 shows spherical aberration of the second example. In the figure, the solid line represents aberration on a plane perpendicular to a scanning plane, and the dotted line represents aberration on the scanning plane.

FIGS. 12 and 13 show lateral aberration on the Gaussian plane corresponding to an object height. FIG. 12 shows aberration on the scanning plane. FIG. 13 show aberration on the plane perpendicular to the scanning plane.

As is clear from the above aberration curves, aberrations are improved on the SOS sensor 30, and even if the SOS sensor 30 is arranged at a position inequivalent to a scanning line, beam converged into a beam with a small diameter is incident on the SOS sensor 30. Thus, an excellent synchronism detection accuracy is obtained. Moreover, the aspherical lens 31 not only corrects aberrations but also makes a correction so that beam incident on the SOS sensor 30 forms an image on the SOS sensor 30 even when the beam deviates from the optical axis. Further, a beam position can be adjusted by moving the SOS sensor 30 in directions shown by the arrows A in FIGS. 6 and 10. In this case, since it is not required to move the aspherical lens 31, the adjustment is easily made.

TABLE 1

| No. | Radius of Curvature (mm) | Axial Distance di (mm) | Refractive Index ni | i |
|---|---|---|---|---|
| (1) | 0 | 0 | 1 | 0 |
| (2) | *6.967 | 1888 | 1 | 1 |
| (3) | −35.458 | 3 | 1.48457 | 2 |
| (4) | 0 | 0 | 1 | 4 |

*Aspherical surface
f: 12.3 mm
S1: 1800 mm
TK: ±3.5 mm

TABLE 2

| (Aspherical Surface Data) | | | |
|---|---|---|---|
| C0 | 0.14354176 | | |
| A2 | 0.00000000 | A3 | 0.00000000 |
| A4 | $-0.33196475 \times 10^{-3}$ | A5 | 0.00000000 |
| A6 | $-0.22958048 \times 10^{-5}$ | A7 | 0.00000000 |
| A8 | $-0.14094870 \times 10^{-6}$ | A9 | 0.00000000 |
| A10 | $-0.16623272 \times 10^{-10}$ | A11 | 0.00000000 |
| A12 | 0.00000000 | A13 | 0.00000000 |
| A14 | 0.00000000 | A15 | 0.00000000 |
| A16 | 0.00000000 | | |

TABLE 3

| No. | Radius of Curvature (mm) | Axial Distance di (mm) | Refractive Index ni | i |
|---|---|---|---|---|
| (1) | 0 | 0 | 1 | 0 |
| (2) | *6.962 | 1888 | 1 | 1 |
| (3) | *−35.588 | 3 | 1.48457 | 2 |
| (4) | 0 | 0 | 1 | 4 |

*Aspherical surface
f: 12.3 mm
S1: 1800 mm
TK: ±3.5 mm

TABLE 4

| (Aspherical Surface Data of Incident Surface) | | | |
|---|---|---|---|
| C0 | 0.14363329 | | |
| A2 | 0.00000000 | A3 | 0.00000000 |
| A4 | $-0.32321858 \times 10^{-3}$ | A5 | 0.00000000 |
| A6 | $-0.32672867 \times 10^{-5}$ | A7 | 0.00000000 |
| A8 | $-0.81143960 \times 10^{-7}$ | A9 | 0.00000000 |
| A10 | $-0.61462347 \times 10^{-12}$ | A11 | 0.00000000 |
| A12 | 0.00000000 | A13 | 0.00000000 |
| A14 | 0.00000000 | A15 | 0.00000000 |
| A16 | 0.00000000 | | |

TABLE 5

| (Aspherical Surface Data of Exit Surface) | | | |
|---|---|---|---|
| C0 | −0.02809913 | | |
| A2 | 0.00000000 | A3 | 0.00000000 |
| A4 | $0.39496770 \times 10^{-5}$ | A5 | 0.00000000 |
| A6 | $0.18378901 \times 10^{-7}$ | A7 | 0.00000000 |
| A8 | $0.35664200 \times 10^{-7}$ | A9 | 0.00000000 |
| A10 | $0.93407501 \times 10^{-13}$ | A11 | 0.00000000 |
| A12 | 0.00000000 | A13 | 0.00000000 |
| A14 | 0.00000000 | A15 | 0.00000000 |
| A16 | 0.00000000 | | |

Obviously, many modifications and variations of the present invention are possible in light of the above teachings. It is therefore to be understood that within the scope of the appended claims, the invention may be practiced other than as specifically described.

What is claimed is:

1. A beam scanning apparatus comprising:
   a beam source for generating an optical beam;
   deflecting means for deflecting the optical beam to scan a beam receiving surface;
   a beam receiving device, arranged at a position inequivalent to the beam receiving surface, for detecting the optical beam which is deflected by the deflecting means; and
   an aspherical lens, arranged in front of the beam receiving device, for converging the optical beam on the beam receiving device, wherein one surface of the aspherical lens is aspherical and the other surface of the aspherical lens is spherical.

2. A beam scanning apparatus as claimed in claim 1, wherein said beam receiving device is arranged beyond a position equivalent to the beam receiving surface.

3. A beam scanning apparatus as claimed in claim 1, wherein said beam source includes a laser diode.

4. A beam scanning apparatus as claimed in claim 1, wherein said deflecting means includes a rotatable polygon mirror.

5. A laser beam scanning apparatus comprising:
   a laser diode for generating laser beam;
   a rotatable polygon mirror for deflecting the laser beam to scan a beam receiving surface;
   a beam receiving device, arranged beyond a position equivalent to the beam receiving surface, for detecting the laser beam which is deflected by the polygon mirror; and
   an aspherical lens, arranged in front of the beam receiving device, for converging the laser beam on the beam receiving device, wherein a refractive power of an end portion of said aspherical lens is weaker than that of a central portion thereof.

6. A laser beams scanning apparatus as claimed in claim 5, wherein one surface of said aspherical lens is aspherical and the other surface of said aspherical lens is spherical.

7. A laser beam scanning apparatus as claimed in claim 6, wherein said aspherical lens has the aspherical surface at beam incident side.

8. A beam scanning apparatus as claimed in claim 5, wherein both surfaces of said aspherical lens are aspherical.

9. A beam scanning apparatus comprising:
   a beam source for generating an optical beam;
   deflecting means for deflecting the optical beam to scan a beam receiving surface;
   a beam receiving device, arranged at a position inequivalent to the beam receiving surface, for detecting the optical beam which is deflected by the deflecting means; and
   an aspherical lens, arranged in front of the beam receiving device, for converging the optical beam on the beam receiving device, wherein both surfaces of the aspherical lens are aspherical.

10. A beam scanning apparatus as claimed in claim 9, wherein said aspherical lens is constructed so that a refractive power of an end portion is weaker than that of a central portion.

11. A beam scanning apparatus comprising:
    a beam source for generating an optical beam;
    deflecting means for deflecting the optical beam to scan a beam receiving surface;
    a beam receiving device, arranged at a position inequivalent to the beam receiving surface, for detecting the optical beam which is deflected by the deflecting means; and
    an aspherical lens, arranged in front of the beam receiving device, for converging the optical beam on the beam receiving device, wherein the aspherical lens is constructed so that a refractive power of an end portion is weaker than that of a central portion.

12. A beam scanning apparatus as claimed in claim 11, wherein one surface of said aspherical lens is aspherical and the other surface of said aspherical lens is spherical.

13. A beam scanning apparatus as claimed in claim 11, wherein said aspherical lens has the aspherical surface at beam incident side.

14. A beam scanning apparatus as claimed in claim 11, wherein both surfaces of said aspherical lens are aspherical.

* * * * *